United States Patent
Liu et al.

(10) Patent No.: US 11,851,533 B2
(45) Date of Patent: Dec. 26, 2023

(54) FLUORINATED DENDRIMER, PREPARATION METHOD AND APPLICATION THEREOF

(71) Applicant: MEGA P&C ADVANCED MATERIALS (SHANGHAI) CO., LTD., Shanghai (CN)

(72) Inventors: Zhengwei Liu, Shanghai (CN); Yuanyuan Cui, Shanghai (CN); Baoying Liu, Shanghai (CN)

(73) Assignee: MEGA P&C ADVANCED MATERIALS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 18/314,792

(22) Filed: May 9, 2023

(65) Prior Publication Data
US 2023/0365759 A1    Nov. 16, 2023

(30) Foreign Application Priority Data
May 10, 2022   (CN) .......................... 202210502250.X

(51) Int. Cl.
C08G 83/00    (2006.01)
C10G 33/04    (2006.01)
C08G 73/02    (2006.01)

(52) U.S. Cl.
CPC .......... *C08G 83/003* (2013.01); *C08G 73/028* (2013.01); *C10G 33/04* (2013.01)

(58) Field of Classification Search
CPC .. C08G 73/028; C08G 83/002; C08G 83/003; C10G 33/04
See application file for complete search history.

(56) References Cited

U.S. PATENT DOCUMENTS
2008/0153931 A1    6/2008    Bruchmann et al.

FOREIGN PATENT DOCUMENTS
| CN | 102333576 A | 1/2012 |
| CN | 110452376 A | 11/2019 |

*Primary Examiner* — Kregg T Brooks

(57) ABSTRACT

The invention a fluorinated dendrimer and a preparation method thereof. The preparation method of the fluorinated dendrimer include the following steps: S1, obtaining an intermediate product by addition reaction of 4-fluoroaniline and methyl acrylate at room temperature; S2, stirring the intermediate product with 1,3-diamino-2-propanol and methyl acrylate at room temperature to obtain a mixture; S3, performing a stage heating reaction of the mixture under a reduced pressure condition to obtain the fluorinated dendrimer. The fluorinated dendrimer can solve the problems of high demulsification temperature, large dosage, and low demulsification efficiency of existing demulsifiers.

9 Claims, 2 Drawing Sheets

FLUORINATED DENDRIMER, PREPARATION METHOD AND APPLICATION THEREOF

FIELD OF THE DISCLOSURE

The disclosure relates to the field of oil-water emulsion, in particular to a fluorinated dendrimer and a preparation method thereof.

BACKGROUND

Oil-water emulsion is widely used in the fields of oil-gas industry, coating industry, fuel chemical industry, environmental science and resource utilization. Stable oil-water emulsion usually has a very adverse impact on production and resource recovery processes. Therefore, it is necessary to treat oil-water emulsion with demulsification technology.

Chemical demulsification is widely used due to its high demulsification efficiency and low usage cost. Chemical demulsification is a method to destabilize the oil-water emulsion by adding a certain amount of chemicals to the emulsion, and finally realize the rapid separation of oil and water under the action of gravity. Traditional demulsifiers still have many problems, such as high demulsification temperature, large dosage of demulsifiers, long demulsification time, and unclear water phase after separation. For example, in Zhang et al.'s study, hyperbranched polymer demulsifiers (PPDA) were synthesized by using an improved "one-pot synthesis" with 1,4-phenylenediamine as the central core and ethylenediamine and methyl acrylate as the branched chain structures. The results of demulsification test show that after demulsification with a 20 mg/L demulsifier, the transmittance of oily wastewater is 47.9% and oil removal rate of oily wastewater is 93.62%. When the temperature rises to 60° C., at the same concentration, the transmittance of the water phase is 57.0% and oil removal rate of the water phase is 96.35%. In addition, when PPDA is used for demulsification of oily wastewater, the separated water phase is not clear. In Ezzat et al.'s study, a series of ethyleneamine-based demulsifiers (DNPA-6, DNPA-5, and DNPA-4) were synthesized in one-step synthesis by the interaction of pentaethylenehexamine, tetraethylenepentamine, or triethylenetetramine with glycidyl ester 4-nonylphenyl ether. The results of demulsification test show that when the addition amount of DNPA-6, DNPA-5 and DNPA-4 is 1000 mg/L, the demulsification temperature is 60° C., and the deposition time is 60 min, the demulsification efficiency of DNPA-6, DNPA-5 and DNPA-4 in crude oil emulsion can respectively reach 80%, 76% and 56%. Therefore, developing efficient, low-cost, and simple synthesis methods for demulsifiers is of great significance.

SUMMARY

The present invention discloses a fluorinated dendrimer and its preparation method, which is used to solve the problems of high demulsification temperature, large dosage, and low demulsification efficiency of existing demulsifiers.

The purpose of the invention is realized through the following technical solutions:

In the first aspect, the present invention provides a fluorinated dendrimer, whose molecular structure formula is shown in formula I:

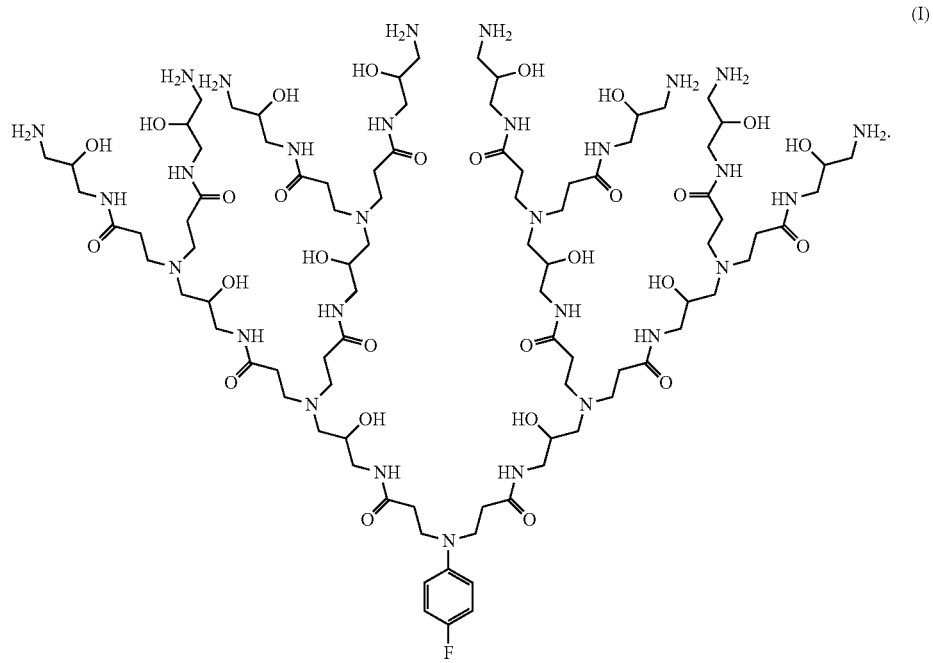 [SMILES: NCC(O)CNC(=O)CCN(CCC(=O)NCC(O)CN)CC(O)CNC(=O)CCN(CCC(=O)NCC(O)CN(CCC(=O)NCC(O)CN)CCC(=O)NCC(O)CN)CC(O)CNC(=O)CCN(CCC(=O)NCC(O)CN(CCC(=O)NCC(O)CN(CCC(=O)NCC(O)CN)CCC(=O)NCC(O)CN)CCC(=O)NCC(O)CN(CCC(=O)NCC(O)CN)CCC(=O)NCC(O)CN)c1ccc(F)cc1]

The fluorinated dendrimer in the invention is a structure formed by using fluorinated 4-fluoroaniline as the initiator, and 1,3-diamino-2-propanol and methyl acrylate as the branched chains. The fluorinated dendrimer can effectively separate stable oil-water emulsion at room temperature with ultra-low dosage.

In the second aspect, the invention provides a preparation method of the fluorinated dendrimer, comprising the following steps:

S1, obtaining an intermediate product by addition reaction of 4-fluoroaniline and methyl acrylate at room temperature;

S2, stirring the intermediate product with 1,3-diamino-2-propanol and methyl acrylate at room temperature to obtain a mixture;

S3, performing a stage heating reaction on the mixture under a reduced pressure condition to obtain the fluorinated dendrimer.

In the step S1, 4-fluoroaniline and methyl acrylate are dissolved in a solvent for addition reaction. Preferably, the solvent is methanol with a dosage of 12-16 times the mass of 4-fluoroaniline.

Preferably, the stirring rate of the reaction is 250-300 r/min in the step S2.

In the step S1, the molar ratio of 4-fluoroaniline to methyl acrylate is 0.9-1.1:1.8-2.2, such as 0.9:1.8, 0.9:2, 0.9:2.2, 1:1.8, 1:2, 1:2.2, 1.1:1.8, 1.1:2, 1.1:2.2. Preferably, the molar ratio of 4-fluoroaniline to methyl acrylate is 1:2 in the step S1.

In the step S1, the time of the addition reaction is 20-28 h. Preferably, the time of the addition reaction is 24 h.

Preferably, the ratio of the total moles of methyl acrylate added in the step S1 and the step S2 to the moles of 1,3-diamino-2-propanol added in the step S2 is 1:1.

The molar ratio of 4-fluoroaniline to 1,3-diamino-2-propanol is 1:13-15. Preferably, the molar ratio of 4-fluoroaniline to 1,3-diamino-2-propanol is 1:14.

Preferably, the reduced pressure condition is ≤0.07 Mpa in the step S3.

Preferably, the program of the stage heating reaction in the step S3 is as follows: reaction at 65° C. for 1 h, then reaction at 80° C. for 1 h, and finally reaction at 100° C. for 2 h.

In the third aspect, the invention provides an application of the fluorinated dendrimer. The application conditions are as follows: the temperature of the demulsification is room temperature (20-30° C.), the demulsification time is 60-240 min, and the concentration of the fluorinated dendrimer is 20-100 mg/L.

The advantages of the technical scheme proposed in the disclosure are: the fluorinated dendrimer is obtained by an improved "one-pot synthesis" with fluorinated 4-fluoroaniline as the initiator and 1,3-diamino-2-propanol and methyl acrylate as the branched chains; the preparation method is simple and the product preparation time is short; the obtained fluorinated dendrimer can realize rapid separation of stable oil-water emulsion at room temperature or low concentration, and the separated water phase is clear.

DETAILED DESCRIPTION OF PREFERRED EMBODIMENTS

The invention will be further described in detail in combination with embodiments to make the purpose, technical scheme, and advantages of the invention clear. The specific embodiments described herein are only used to explain the invention and are not intended to limit the invention.

The present invention provides a fluorinated dendrimer, whose molecular structure formula is shown in formula I:

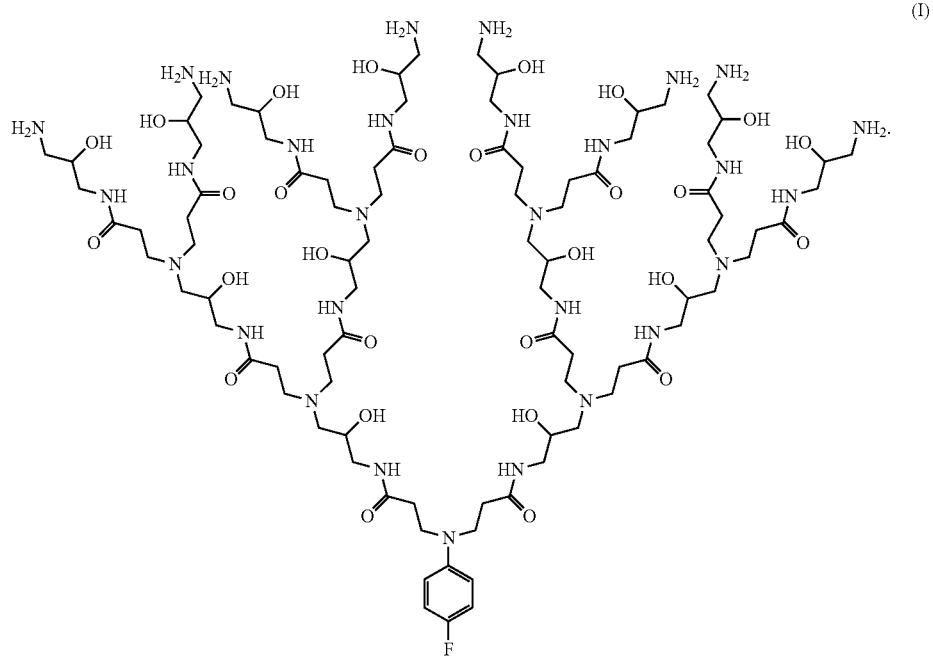 [SMILES: NCC(O)CNC(=O)CCN(CCC(=O)NCC(O)CN)CC(O)CNC(=O)CCN(CCC(=O)NCC(O)CN(CCC(=O)NCC(O)CN)CCC(=O)NCC(O)CN)CC(O)CNC(=O)CCN(CCC(=O)NCC(O)CN(CCC(=O)NCC(O)CN(CCC(=O)NCC(O)CN)CCC(=O)NCC(O)CN)CCC(=O)NCC(O)CN(CCC(=O)NCC(O)CN)CCC(=O)NCC(O)CN)c1ccc(F)cc1]

(I)

The fluorinated dendrimer in the invention is a structure formed by using fluorinated 4-fluoroaniline as the initiator, and 1,3-diamino-2-propanol and methyl acrylate as the branched chains. The fluorinated dendrimer can effectively separate stable oil-water emulsion at room temperature with ultra-low dosage.

The invention also provides a preparation method of the fluorinated dendrimer, comprising the following steps:
S1, obtaining an intermediate product by addition reaction of 4-fluoroaniline and methyl acrylate at room temperature;
S2, stirring the intermediate product with 1,3-diamino-2-propanol and methyl acrylate at room temperature to obtain a mixture;
S3, performing a stage heating reaction on the mixture under a reduced pressure condition to obtain the fluorinated dendrimer.

Figure 1:
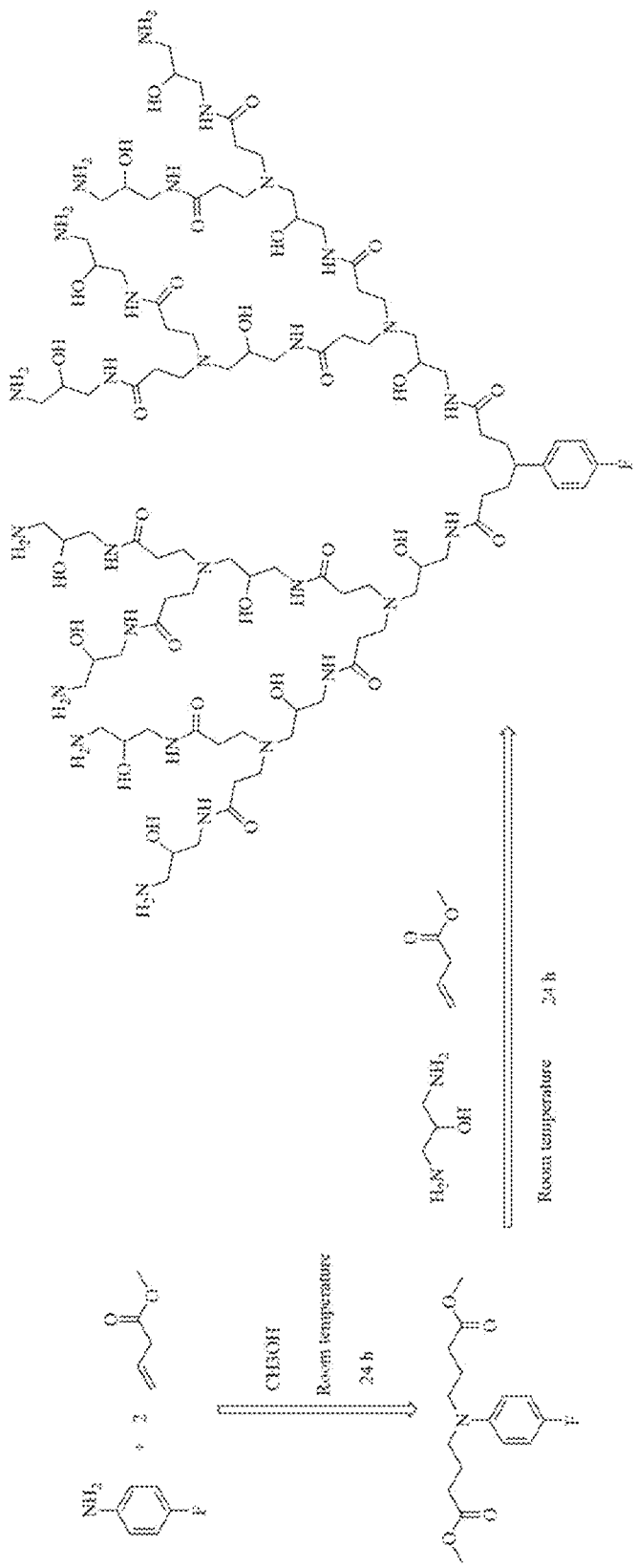
FIG. 1 is a schematic diagram of the synthesis of fluorinated dendrimer.

The synthesis of fluorinated dendrimer is shown in FIG. 1. Firstly, obtaining an intermediate product by addition reaction of 4-fluoroaniline and methyl acrylate at room temperature; Secondly, the intermediate product is polymerized by methyl acrylate and 1,3-diamino-2-propanol as branched chains to obtain the fluorinated dendrimer. This preparation method obtains the product by an improved "one-pot synthesis", with a simple process, short preparation time, high efficiency, low cost, simple synthesis method, and fewer by-products.

In the step S1, 4-fluoroaniline and methyl acrylate are dissolved in a solvent for addition reaction. Preferably, the solvent is methanol with a dosage of 12-16 times the mass of 4-fluoroaniline.

In the step S2, the stirring rate of the reaction is 250-300 r/min.

In the step S1, the molar ratio of 4-fluoroaniline to methyl acrylate is 0.9-1.1:1.8-2.2.

In the step S1, the time of the addition reaction is 20-28 h.

The ratio of the total moles of methyl acrylate added in the step S1 and the step S2 to the moles of 1,3-diamino-2-propanol added in the step S2 is 1:1.

The molar ratio of 4-fluoroaniline to 1,3-diamino-2-propanol is 1:13-15. Preferably, the molar ratio of 4-fluoroaniline to 1,3-diamino-2-propanol is 1:14.

In the step S3, the reduced pressure condition is ≤0.07 Mpa.

In the step S3, the program of the stage heating reaction is as follows: reaction at 65° C. for 1 h, then reaction at 80° C. for 1 h, and finally reaction at 100° C. for 2 h.

In the following example, the preparation scheme of a stable oil-water emulsion is as follows: uniformly mixing 50 g of diesel oil, 0.91 g of Tween 80, 0.09 g of Span 80 and 450 g of distilled water, and then stirring at the speed of 11000 r/min for 20 min to obtain the stable oil-water emulsion. The emulsion has not shown obvious oil-water separation after standing for one week at room temperature.

Example 1

This embodiment provides a fluorinated dendrimer, whose molecular structure formula is shown in formula I:

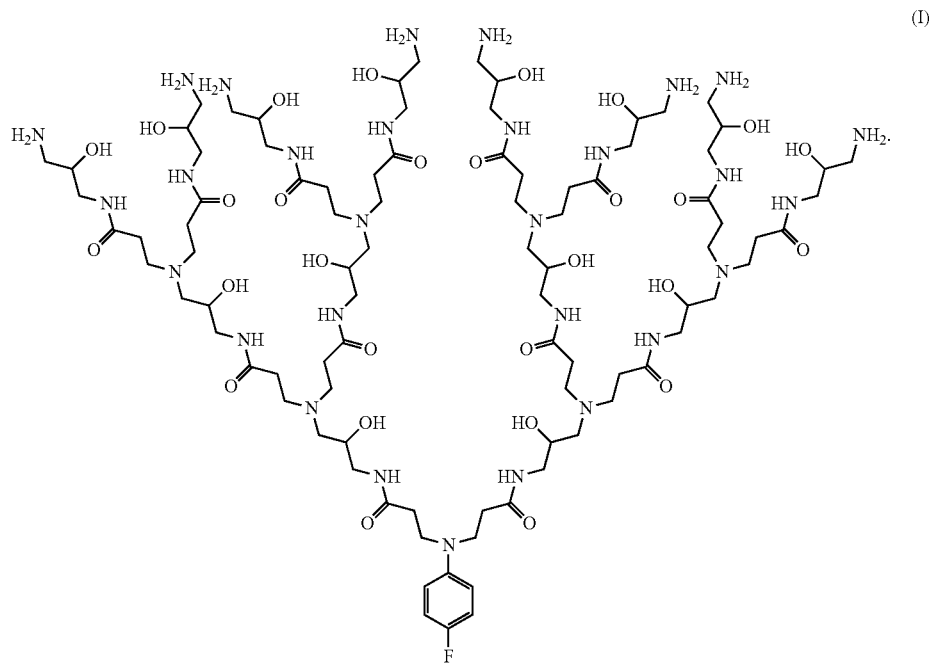 [SMILES: NCC(O)CNC(=O)CCN(CCC(=O)NCC(O)CN)CC(O)CNC(=O)CCN(CCC(=O)NCC(O)CN(CCC(=O)NCC(O)CN)CCC(=O)NCC(O)CN)CC(O)CNC(=O)CCN(CCC(=O)NCC(O)CN(CCC(=O)NCC(O)CN(CCC(=O)NCC(O)CN)CCC(=O)NCC(O)CN)CCC(=O)NCC(O)CN(CCC(=O)NCC(O)CN)CCC(=O)NCC(O)CN)c1ccc(F)cc1]

(I)

Figure 2:
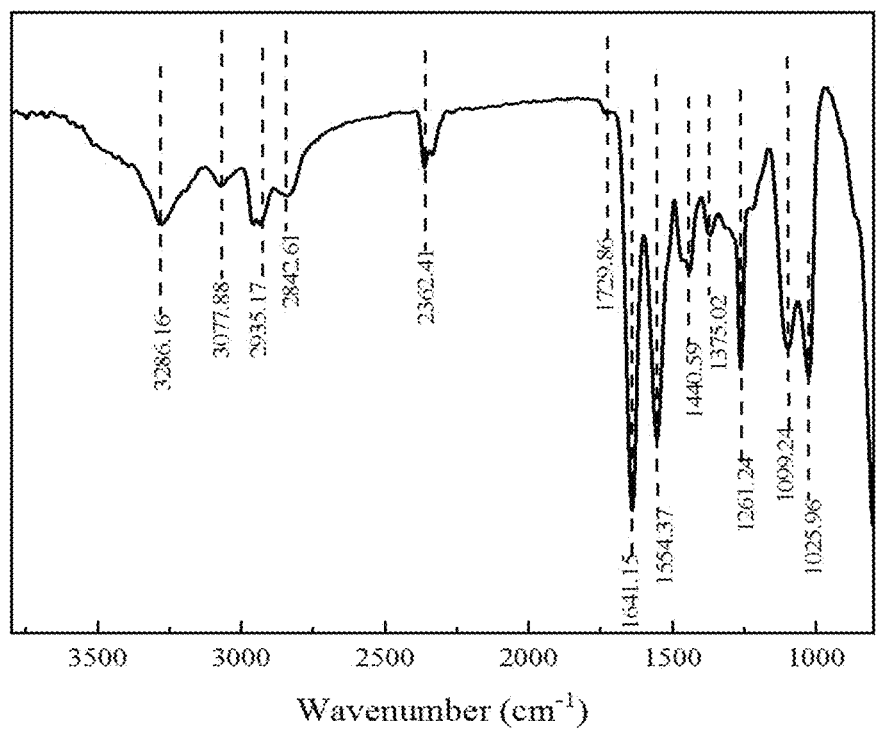
FIG. 2 is a FT-IR diagram of the fluorinated dendrimer in the Example 1.
Figure 3:
FIG. 3 is a statistical diagram of the demulsification effect of the fluorinated dendrimer in the Example 1 at different dosages.

This embodiment also provides a preparation method of the fluorinated dendrimer, comprising the following steps:
S1, adding 0.02 mol (2.22 g) of 4-fluoroaniline and 30 mL of methanol to a flask, stirring it until completely dissolved, and then adding 0.04 mol (3.44 g) of methyl acrylate to it. At room temperature, continuously stirring for 24 h to obtain an intermediate product.
S2, adding 0.28 mol (25.24 g) of 1,3-diamino-2-propanol and 0.24 mol (20.66 g) of methyl acrylate directly to the intermediate product obtained in the step S1, and continuously stirring at the speed of 250-300 r/min for 24 h at room temperature.
S3, performing a stage heating reaction on the mixture obtained from the step S2 under a reduced pressure condition of 0.07 Mpa to obtain the fluorinated dendrimer. The program of the stage heating reaction is as follows: reaction at 65° C. for 1 h, then reaction at 80° C. for 1 h, and finally reaction at 100° C. for 2 h. The fluorinated dendrimer was prepared, and its FT-IR diagram is shown in FIG. 2, indicating successful preparation.

Example 2

The difference in preparation steps between the example 1 and the example 2 is as follows: in the step S1, the molar weight of 4-fluoroaniline is 0.9 mol, the molar weight of methyl acrylate is 2.2 mol, and the addition reaction time is 26 h; in the step S2, the molar weight of 1,3-diamino-2-propanol is 11.7 mol, and the molar weight of methyl acrylate is 9.5 mol; in the step S3, the pressure under reduced pressure conditions is 0.08 Mpa.

Example 3

The difference in preparation steps between the example 1 and the example 2 is as follows: in the step S1, the molar weight of 4-fluoroaniline is 0.11 mol, the molar weight of methyl acrylate is 0.18 mol, and the addition reaction time is 26 h; in the step S2, the molar weight of 1,3-diamino-2-propanol is 1.65 mol, and the molar weight of methyl acrylate is 1.47 mol; in the step S3, the pressure under reduced pressure conditions is 0.075 Mpa.

Test 1

Adding the fluorine containing dendrimer of the Example 1 as a demulsifier into the stable oil-water emulsion. The concentration of demulsifier in oil-water emulsion is 40 mg/L, the demulsification temperature is room temperature, and the demulsification time is 60-240 min. The transmittance and oil removal rate of the water phase after oil-water separation are shown in Table 1.

TABLE 1

| Demulsification time (min) | 60 | 120 | 180 | 240 |
| --- | --- | --- | --- | --- |
| Transmittance (%) | 30.2 | 52.5 | 64.8 | 85 |
| Oil removal rate (%) | 99.30 | 99.53 | 99.65 | 99.85 |

Test 2

Adding the fluorine containing dendrimer of the Example 1 as a demulsifier into the stable oil-water emulsion. The concentration of demulsifier in oil-water emulsion is 60 mg/L, the demulsification temperature is room temperature, and the demulsification time is 60-240 min. The transmittance and oil removal rate of the water phase after oil-water separation are shown in Table 2.

TABLE 2

| Demulsification time (min) | 60 | 120 | 180 | 240 |
| --- | --- | --- | --- | --- |
| Transmittance (%) | 35.1 | 56.3 | 70.9 | 88.4 |
| Oil removal rate (%) | 99.35 | 99.56 | 99.71 | 99.88 |

Test 3

Adding the fluorine containing dendrimer of the Example 1 as a demulsifier into the stable oil-water emulsion. The concentration of demulsifier in oil-water emulsion is 80 mg/L, the demulsification temperature is room temperature, and the demulsification time is 60-240 min. The transmittance and oil removal rate of the water phase after oil-water separation are shown in Table 3.

TABLE 3

| Demulsification time (min) | 60 | 120 | 180 | 240 |
| --- | --- | --- | --- | --- |
| Transmittance (%) | 47.7 | 53 | 66.1 | 84.2 |
| Oil removal rate (%) | 99.48 | 99.53 | 99.66 | 99.84 |

Test 4

Adding the fluorine containing dendrimer of the Example 1 as a demulsifier into the stable oil-water emulsion. The concentration of demulsifier in oil-water emulsion is 20-100 mg/L, the demulsification temperature is room temperature, and the demulsification time is 120 min. The transmittance and oil removal rate of the water phase after oil-water separation are shown in Table 4.

TABLE 4

| Concentration (mg/L) | 20 | 40 | 60 | 80 | 100 |
| --- | --- | --- | --- | --- | --- |
| Transmittance (%) | 52.9 | 52.5 | 56.3 | 53 | 51.2 |
| Oil removal rate (%) | 99.53 | 99.52 | 99.56 | 99.53 | 99.51 |

Test 5

Adding the fluorine containing dendrimer of the Example 1 as a demulsifier into the stable oil-water emulsion. The concentration of demulsifier in oil-water emulsion is 20-100 mg/L, the demulsification temperature is room temperature, and the demulsification time is 240 min. The transmittance and oil removal rate of the water phase after oil-water separation are shown in Table 5.

TABLE 5

| Concentration (mg/L) | 20 | 40 | 60 | 80 | 100 |
| --- | --- | --- | --- | --- | --- |
| Transmittance (%) | 76.7 | 85.0 | 88.4 | 84.2 | 82 |
| Oil removal rate (%) | 99.76 | 99.85 | 99.88 | 99.84 | 99.82 |

The above descriptions are only preferred embodiments of the present invention and are not intended to limit the present invention. Any modification, equivalent replacement, improvement, etc., made within the spirit and principle of the present invention shall be included in the protection of the present invention.

What is claimed is:

1. A fluorinated dendrimer, whose molecular structure formula is shown in formula I:

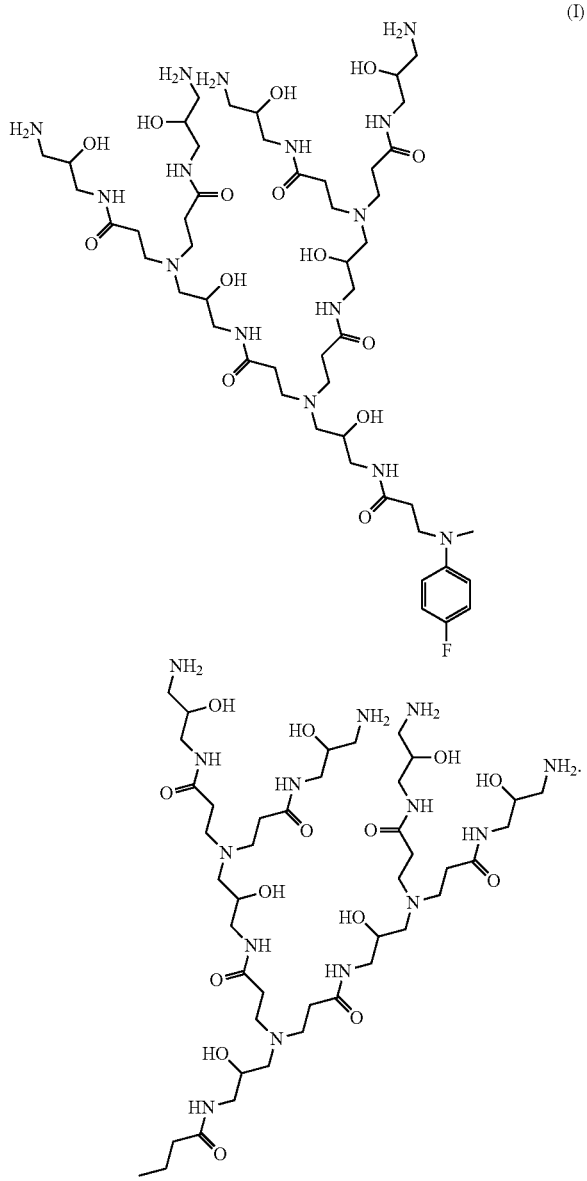

2. A preparation method of the fluorinated dendrimer according to claim 1, including the following steps:

S1, obtaining an intermediate product by addition reaction of 4-fluoroaniline and methyl acrylate at room temperature;

S2, stirring the intermediate product with 1,3-diamino-2-propanol and methyl acrylate at room temperature to obtain a mixture;

S3, performing a stage heating reaction on the mixture under a reduced pressure condition to obtain the fluorinated dendrimer.

3. The preparation method of the fluorinated dendrimer according to claim 2, wherein the molar ratio of 4-fluoroaniline to methyl acrylate is 0.9-1.1:1.8-2.2 in the step S1.

4. The preparation method of the fluorinated dendrimer according to claim 2, wherein the time of the addition reaction is 24-26 h in the step S1.

5. The preparation method of the fluorinated dendrimer according to claim 2, wherein the ratio of the total moles of methyl acrylate added in the step S1 and the step S2 to the moles of 1,3-diamino-2-propanol added in the step S2 is 1:1.

6. The preparation method of the fluorinated dendrimer according to claim 2, wherein the molar ratio of 4-fluoroaniline to 1,3-diamino-2-propanol is 1: 13-15.

7. The preparation method of the fluorinated dendrimer according to claim 2, wherein the reduced pressure condition is ≤0.07 Mpa in the step S3.

8. The preparation method of the fluorinated dendrimer according to claim 2, wherein the program of the stage heating reaction in the step S3 is as follows: reaction at 65° C. for 1 h, then reaction at 80° C. for 1 h, and finally reaction at 100° C. for 2 h.

9. A process comprising adding the fluorinated dendrimer of claim 1 to an oil water emulsion at a concentration of the fluorinated dendrimer of 20-100 mg/L, then allowing demulsification of the oil water emulsion at room temperature for 60-240 minutes.

* * * * *